United States Patent [19]

Mills et al.

[11] 4,413,966

[45] Nov. 8, 1983

[54] FLUID-RELEASE MOLD AND THE METHOD OF MANUFACTURING THE SAME

[75] Inventors: Walter H. Mills; Joseph T. Bilbrey, Sr., both of Springfield, Ohio

[73] Assignee: Wallace Murray Corporation, New York, N.Y.

[21] Appl. No.: 277,673

[22] Filed: Jun. 26, 1981

[51] Int. Cl.$^3$ ........................ B28B 21/36; B28B 1/00; B28B 1/26; B29C 1/02

[52] U.S. Cl. ........................................ 425/84; 264/86; 264/225; 264/335; 425/424; 425/437; 425/DIG. 102; 425/DIG. 119

[58] Field of Search ....... 425/84, 424, 437, DIG. 102, 425/DIG. 119, 175, 176; 264/86, 225, 335

[56] References Cited

U.S. PATENT DOCUMENTS 2,191,857 2/1940 Miller ................................ 264/335
2,584,109 2/1952 Blackburn et al. .................. 25/129
2,584,110 2/1952 Blackburn et al. .................. 25/129
3,384,499 5/1968 Blackburn et al. ................ 106/38.9
3,755,213 8/1973 Kendall et al. ................ 260/2.5 EP
3,993,727 11/1976 Skriletz et al. ...................... 264/225
4,076,779 2/1978 Skriletz ................................ 264/39

*Primary Examiner*—H. S. Cockeram
*Attorney, Agent, or Firm*—Schuyler, Banner, Birch, McKie & Beckett

[57] ABSTRACT

A fluid-release mold is disclosed. The mold includes a preformed, porous mold body having a mold face formed on a first exterior surface and a second surface. A groove is formed in the second surface. A tape covers the groove to form a conduit between the surface of the groove and the surface of the tape facing the groove. The conduit directs pressurized release fluid to the mold. A fluid impermeable backing material is disposed over the second surface of the mold body whereby egress of the fluid from the conduit is prevented except through the mold body in a direction away from the second surface.

25 Claims, 3 Drawing Figures

FLUID-RELEASE MOLD AND THE METHOD OF MANUFACTURING THE SAME

TECHNICAL FIELD

The present invention is directed to air-release press molding of both the RAM type and the pressure casting type. Air-release press molding has been widely adopted in the ware forming industry.

BACKGROUND OF THE INVENTION

The RAM type process involves pressing a quantity of plastic clay between cooperating male and female molds or dies formed of porous, fluid-permeable material. In addition to shaping the ware, the pressing operation also substantially dewaters the clay by forcing excess water into the pores of the molds. Release of the shaped ware, which adheres to the mold faces, is accomplished without distorting or damaging the ware by applying fluid pressure to a conduit embedded in one of the mold bodies so that the fluid passes from the conduit, diffuses throughout the porous mold body and exits through the mold face as a uniform blanket shortly before the male and female die members are separated. The shaped clay ware adheres to the second mold or die which is tranferred to a ware depositing station where fluid pressure is applied in a like manner to the second mold member to complete the release of the formed article. This basic process is disclosed in U.S. Pat. Nos. 2,584,109 and 2,584,110. In the pressure casting process, relatively liquid clay is used in place of plastic clay and the time within the mold is increased.

The original air-release mold bodies were formed of high grade gypsum plaster or gypsum cement which was found to have nearly ideal porosity for proper fluid permeability. Perforated metal tubing or permeable woven tubing was cast in the plaster molds to provide the required fluid conduits. The gypsum materials, however, were of limited hardness and consequently over the course of repeated pressing operations the faces of the molds would gradually wear away until the molds became unusable and had to be replaced. Although the service life of gypsum molds varied depending on the characteristics of the plastic clay being pressed, the configuration of the molds, the applied force and other factors, the practical service life of gypsum molds was generally no more than about 1,000 pressing operations. This necessitated relatively frequent replacement of the molds with the attendant disadvantages of expense for replacement molds, loss of production time, and nonuniformity of the produced ware due to slight differences between molds. Consequently, the ware forming industry searched for a substitute material for forming the molds which would have the required porosity characteristics closely approximating those of gypsum plaster and which would have a greater hardness enabling it to resist wear.

A crystalline bonded ceramic comprising at least 70% alumina, up to 15% ball clay and up to 15% talc fired to a point short of the theoretical density for the ceramic has been found to be a virtually ideal material. This material is disclosed in U.S. Pat. No. 3,384,499. The alumina, ball clay and talc composition with or without additives, such as manganese dioxide or carbon black, is formed into a slurry, cast and subsequently fired at a temperature ranging from 2,000° F. to 2,350° F. The exact firing conditions are controlled to prevent the ceramic mold body from reaching its theoretical density, i.e., the maximum density that the material would achieve if fired to an essentially solid nonporous state.

The necessary fluid conduit means were formed in the interior of the mold bodies by casting a combustible tubing in the interior of the alumina, ball clay, and talc mold body which was later consumed during the firing operation to leave an open conduit running through the mold body. It was generally considered necessary to form the fluid conduit in the interior of the mold body in order to provide for maximum transfer of fluid from the conduit to the mold body by utilizing the entire circumference of the conduit.

Porous fluid-release molds and dies formed from the new alumina, ball clay and talc material have vastly superior tensile strength, hardness, and wear resisting properties. Whereas a fluid-release, porous mold of gypsum material had a useful service life of approximately 1,000 pressing operations, molds and dies formed of the new material were capable of resisting wear and breakage and had a potential useful service life of literally tens of thousands of pressing operations.

In actual operation it was found, however, that the fluid permeability of molds or dies formed of the new alumina, ball clay and talc material progressively decreased so that after two or three thousand pressing operations, the molds were useless because they would no longer conduct sufficient fluid to effect a smooth release of the ware from the mold faces. After just a few thousand pressing operations, the new molds had to be replaced even though the mold faces were not appreciably worn or broken.

The problem of accumulation of residue in the pores of the mold bodies was solved by casting and firing the alumina, ball clay, and talc mold body without a consumable tube forming a conduit therein. After the mold body has been fired, fluid-permeable conduit means are affixed to the exterior of the mold body at some point other than on the mold face and the non-communicating surfaces of the permeable conduit means and the exterior surface of the mold body except for the mold face are sealed against passage of fluid so that when pressurized fluid is supplied to the fluid conduit means, the fluid is constrained to pass through the portion of the permeable conduit means communicating with the mold body and form thence through the mold body and to exit through the mold face. The size and spacing of the fluid conduit means may be vaired in order to regulate the egress of fluid through the mold face.

Such a conduit system is illustrated in U.S. Pat. No. 3,993,727 issued to Rudolf A. Skriletz and Virgil D. Kendall on Nov. 23, 1976, the disclosure of which is hereby incorporated. In this system, a mold body is first fired to a point short of the theoretical density of the material in a conventional manner specified in the '727 patent. The ceramic mold body is preferably comprised of at least 70% alumina, up to 15% ball clay and up to 15% talc by weight. The mold body is formed with a mold face on its exterior surface and a second surface on which the fluid conduit means is disposed. A groove can be formed in the second surface for reception of the fluid conduit means, or the fluid conduit means may be placed directly on an ungrooved second surface. The conduit means is a fluid-permeable conduit made of a perforated metal, a rigid metal mesh conduit or a tube formed of wooven fabric material such as cotton or nylon. Asbestos fibers could also be used for high temperature applications. Woven fabric is preferred because of its low cost and the ease of handling such light weight flexible materials. Perforated thermosetting semiplastic tubing or thermosetting plastic mesh may also be used.

After the fluid conduit is placed on the second surface of the mold body, it is sealed by covering it with a sealing composition. Practically any fluid impermeable adhesive resinous material may be used. The viscosity of the sealing composition should be sufficiently high that the sealer will not flow between the fluid permeable conduit and the mold body. The sealing composition should at least cover the entire length of the fluid-permeable conduit which is in contact with the mold body. Since the sealer material is relatively thick, it is applied by hand and frequently gaps are left over the fluid permeable conduit. Such gaps are difficult to detect by visual inspection. Hence, it is desirable that a second sealing composition be applied over the first sealing composition. The second sealing composition should be somewhat more liquid than the first sealing composition to flow into and seal any gaps which may exist in the first sealing composition. This second sealing material is preferaby spread over the entire second or outer surface of the mold body. Thereafter, a backing material comprised of an epoxy, sand and gravel mixture is applied. The mold body and backing material are all held in a metal casing.

The use of the fluid conduit covered by several layers of sealing composition is expensive both from a labor and a material standpoint. When this type of mold is used in a RAM process, the molds frequently deteriorate prior to unacceptable deterioration of the fluid conduits. The deterioration or failure of the molds in the RAM process is due to the high stresses placed on the mold and the abrasiveness of the clay. This is particularly true, if the mold face has a complex shape. Typically the ceramic mold has a life expectancy of 25,000 to 50,000 pressings. Typically the mold would be used a 1,000 times a day so as to have a life expectancy of two to three months. However, when the mold is used in press casting, the mold has a longer life expectancy, for example, ten years. This is true because less stress is placed upon the mold. A relatively liquid clay is placed in the mold, rather than the abrasive plastic clay. The mold is operated less frequently, for example, twice per hour. Also, the pressure applied to the mold is frequently less than the pressure which is applied in a RAM process. During such an expanded life span, it is expected that the tubing forming the fluid conduit would deteriorate prior to other failure occuring in the mold.

SUMMARY OF THE INVENTION

The present invention is directed to a fluid-release mold and to a method for making the same. The mold is comprised of a preformed porous mold body having a mold face formed on a first exterior surface and a second surface. A groove is formed in the second surface and a tape means is provided for covering the groove. In this manner, a conduit is formed between the surface of the groove and the surface of the tape means which faces the groove. The conduit serves the purpose of directing pressurized release fluid to the mold. A fluid-impermeable backing material is disposed over the second surface of the mold body whereby egress of the fluid from the conduit is prevented except through the mold body in a direction away from the second surface.

In a preferred embodiment, the tape means is comprised of flexible adhesive aluminum foil tape. The tape has a width greater than the width of the groove at the second surface of the mold body and is attached on either side of the groove.

The mold body is preferably formed of a ceramic material. For example, a ceramic material comprised of at least 70% alumina, up to 15% ball clay and up to 15% talc. The backing material is preferably made of a sand and gravel mixture bonded together by an expoxy resin.

By forming the conduit in the manner of the present invention, both labor and material savings are incurred. The time consuming process of placing several layers of a sealant composition over porous tubing is eliminated. This time consuming step is replaced by the relatively easy step of pressing an adhesive tape on either side of a groove formed in the mold body. Also, since only tape is used, rather than porous tubing and two sealant materials, material costs are also reduced.

A conduit formed in accordance with this invention also exhibits better flow characteristics than prior art conduits formed of a porous material. The conduit of the present invention is open directly to the mold body. No intermediate layer of material is presented between the flow conduit and the mold body. Also, the expected useful life of the conduit should be longer than that of conduits formed of porous fibers and is expected to extend through the normal life of a ceramic mold used in pressure casting.

Various advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described an embodiment of the invention.

DETAILED DESCRIPTION OF THE INVENTION

Figure 1:
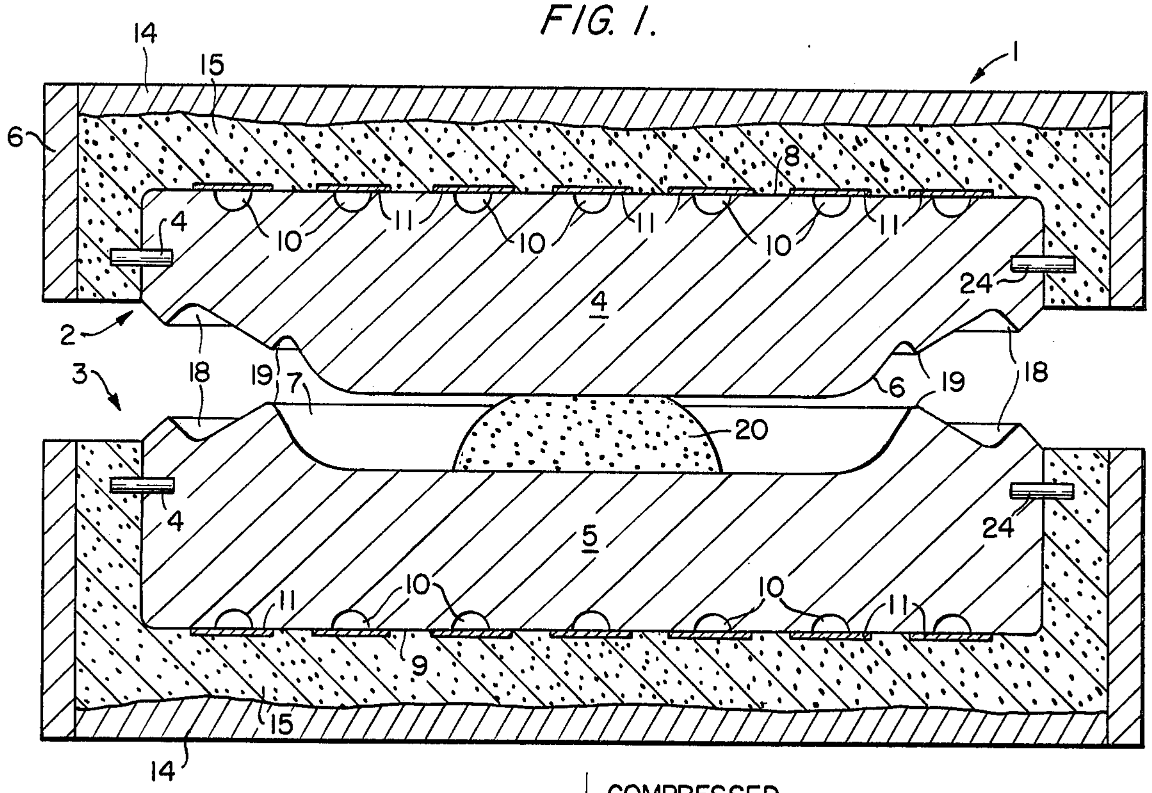
FIG. 1 is a sectional view of a porous, fluid-release press mold constructed in accordance with the present invention.
Figure 2:
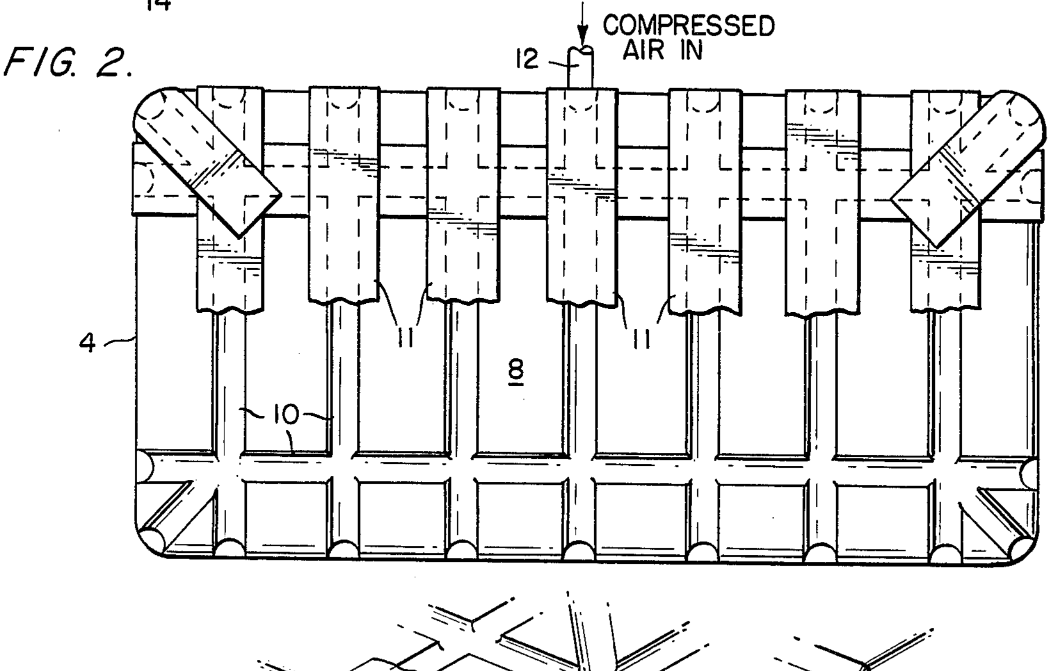
FIG. 2 is a plan view, partially in section, of a porous mold body removed from the backing material and casing.
Figure 3:
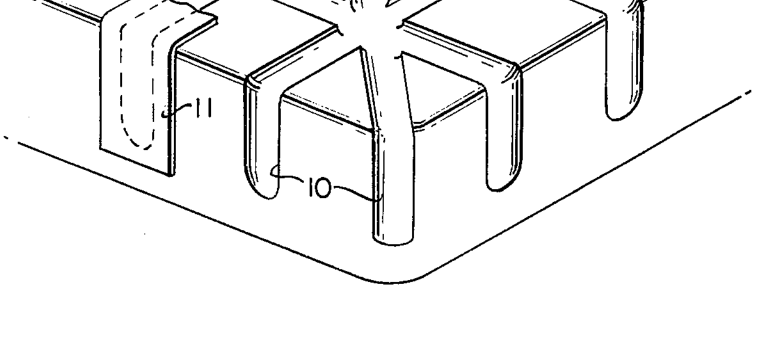
FIG. 3 is a perspective view of a corner of a mold body.

FIG. 1 shows a press mold generally designated by reference number 1 which comprises an upper male member 2 and a lower female member 3. The porous alumina, ball clay and talc mold body of the male mold member 2 is designated by reference numeral 4. The porous alumina, ball clay and talc mold body of female mold member 3 is designated by reference numeral 5. The adjacent faces of mold bodies 4 and 5 are formed as mold faces 6 and 7 on the male and female mold bodies, respectively. Wet plastic clay, designated by reference number 20, is shaped to produce a desired shape clay article by pressing it between the mold faces 6 and 7 of the mold bodies 4 and 5. If the press mold 1 were to be used in a pressure casting process, a liquid clay mass would be inserted into the mold cavity in place of the relatively viscous plastic clay 20. The back of male body 4, opposite mold face 6, is designated by reference number 8. Similarly, the back surface of female mold body 5, opposite mold face 7, is designated by reference number 9. The back surfaces 8 and 9 of the porous mold bodies are provided with a series of grooves designated by reference number 10. As seen in FIG. 2, the grooves may be arranged in a rectangular grid pattern. Alternatively, the grooves may be arranged in a generally concentric relationship or they may be arranged in a spiral relationship or in alternating S-curves back and forth across the back surface of the mold body or in some other relationship. The only requirement is that the grooves be arranged so that fluid is conveyed through the mold body to substantially the entire mold face. In practice it may be found desirable to adjust the spacing of the conduit members so that they lie closer together adjacent portions of the mold face where release of the formed clay article from the mold is particular critical, thereby providing for a slightly increased flow of fluid through such portions. Such a modification is considered within the scope of the invention.

The grooves 10 are covered with tape means, preferably flexible aluminum foil adhesive tape 11. As seen in FIG. 2, the tape 11 has a width greater than the width of the grooves 10 at the second surface 8. The tape 11 is thus applied to either side of the grooves 10. The tape is typically applied over the grooves and pressed onto the second surface with moderate hand pressure by a sponge. In this manner, a secure seal is formed on either side of the grooves 10. The tape 11 may be any suitable tape which exhibits the properties of flexibility, good bonding to the ceramic material and capability of withstanding high temperatures which occur during the curing of the backing material. A tape produced by the 3M company, identified as No. 425 aluminum foil tape has been found particularly suitable. Typically, the groove 10 is formed as a $\frac{3}{8}$ inch groove and $\frac{3}{4}$ or 1 inch aluminum foil tape is placed over the groove. A conduit for directing pressurized release fluid is thereby formed between the surface of the groove 10 and the tape 11. The conduit is unobstructed and the fluid in the conduit is in direct contact with the surface of the mold body. An inlet tube 12 is inserted through the aluminum tape 11 and sealed thereto by an epoxy adhesive. For example, the inlet tube 12 can be a copper air line and a thixotropic epoxy, number 1126 produced by Ren Plastic of Lansing, Mich. may be used to connect the tube 12 to the tape 11. This epoxy would also preclude leakage of the backing material into the air system when the backing material is applied.

Mold bodies 4 and 5 with the attached tape 11 are mounted in appropriate casings 16 and 17 respectively. The casings are normally formed of cast iron or steel, but any other material of suitable strength and rigidity could of course be substituted therefor. The spaces between the mold bodies and the casing members are filed with a backing material to provide adequate support for the mold bodies. The backing material is designated in FIG. 1 by reference number 15 and preferably comprises a mixture of epoxy, sand and gravel formed by mixing together 9 pounds of a low-shrinkage epoxy adhesive resin, approximately fourty-four pounds of fine pea gravel and approximately sixteen pounds of sand. A suitable low-shrinkage adhesive resin is manufactured by Ren Plastics of Lansing, Mich., and sold under the trademark RP1700. While the resin, sand and gravel mixture is curing, fine gravel is sprinkled over the back. This gravel forms an irregular surface which serves to anchor a plaster cap 14 about 1 inch thick which is poured over the back of the backing material in order to provide a smooth rear surface for the assembled unit. Alternatively, the back of the epoxy, sand and gravel mixture can be machined flat to provide a smooth surface. Gypsum plaster may also be used as the backing material. The mold bodies are secured in their casings by means of steel pins 24 which extend from sockets in the mold bodies in the backing material.

To aid in bonding the backing material 15 to the surface 8 or 9 of the respective mold body 4, 5 a layer of epoxy resin can be applied to the surface 8, 9 prior to inserting the backing material 15. The epoxy resin may be the same resin that is used to bond the sand and fine gravel.

In operation of the mold in a RAM type process, a body of moist plastic clay, designated by reference number 20, is placed between the mold surfaces 6 and 7 and the male and female mold members 2 and 3, are brought together until the clay is pressed between them to the desired shape. A slight excess of clay is used, and the excess is forced out from between the mold faces 6 and 7 into the gutters designated by reference numeral 18 during the pressing operation. When the mold members 2 and 3 are completely closed, the excess clay in gutters 18 is trimmed from the shaped clay article by cutting points 19 formed around the edges of the mold faces and compressed air is then introduced through the conduit formed between the surface of the groove 10 and the tape 11 in one of the mold bodies, usually the lower of the two, as the mold is opened. This causes the shaped clay article to be released from the lower mold body, while it continues to adhere to the mold face of the upper body. The upper mold is then transferred to a depositing station where compressed air is introduced through the conduit formed between its surface of the groove 10 and the tape 11 in the upper mold body, whereby release of the shaped clay article from such body is effected. The cycle is thereafter repeated with a further mass of wet plastic clay. While, as depicted in the drawings, in the disclosed embodiment the male member is the upper member, the positions of the male and female members may be reversed without departing from the scope of the invention.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matteres of shape, size, and arrangement of parts, within the principle of the invention, to the full extent indicated by the broad general meaning of the terms in which the appended claims are expressed.

We claim:

1. A fluid-release mold comprising:
   - a preformed, porous mold body having a mold face formed on a first exterior surface and a second surface;
   - at least one narrow groove formed in said second surface;
   - tape covering said groove and attached to said second surface to form a conduit between the surface of said groove and the surface of said tape facing said groove for directing pressurized release fluid to said mold; and
   - a fluid-impermeable backing material disposed over said second surface of said mold body to direct the egress of fluid from said conduit through said mold body in a direction away from said second surface.

2. A fluid-release mold in accordance with claim 1 wherein said tape is comprised of flexible tape having a width greater than the width of said groove at said second surface of said mold body, said tape being attached to the said second surface of said mold body on both sides of said groove.

3. A fluid-release mold in accordance with claim 2 wherein said flexible tape is comprised of an aluminum foil tape.

4. A fluid-release mold in accordance with claim 3 wherein said aluminum foil tape has an adhesive on one of its surfaces for attaching said aluminum foil tape to the second surface of said mold.

5. A fluid-release mold in accordance with claim 1 wherein said backing material covers substantially all of said second surface of said mold and substantially all of said tape.

6. A fluid-release mold in accordance with claim 5 wherein said backing material is comprised of a mixture of sand and fine gravel bonded together by an epoxy resin.

7. A fluid-release mold in accordance with claim 1, 2 or 6 further comprising a metal casing surrounding said mold body and said backing material.

8. A fluid release mold comprising:

a preformed, porous mold body, made from an alumina containing ceramic material fired to a point short of the theoretical density for said material; said preformed mold body having a first exterior surface and a second opposite interior surface; a mold face formed on said first surface and at least one narrow fluid directing groove formed in said second surface;

flexible tape covering said groove to form a conduit between the surface of said groove and the surface of said tape facing said groove for directing pressurized release fluid to said mold, said surface of said tape having an adhesive coating for attaching said tape to said second interior surface, said tape having a width greater than the width of said groove at the second interior surface of said mold body wherein said tape is attached to said second interior surface on both sides of said groove; and a fluid impermeable backing material secured to and disposed over substantially the entire interior surface of said mold body to direct egress of fluid said conduit through said mold body in a direction away from said second interior surface, said backing material comprising a mixture of sand and fine gravel bonded together by an epoxy resin.

9. A fluid-release mold in accordance with claim 8 wherein said ceramic mold body comprises at least 70% alumina, up to 15% ball clay and up to 15% talc by weight.

10. A fluid-release mold in accordance with claim 8 wherein the conduit formed by said groove and tape is arranged such that the release fluid supplied to said conduit is conveyed through the mold body to substantially the entire mold face.

11. A fluid-release mold in accordance with claim 8 wherein said tape is comprised of aluminum foil adhesive tape.

12. A fluid-release mold in accordance with claim 8 wherein said groove is approximately $\frac{3}{8}$ inches wide and said tape is approximately at least $\frac{3}{4}$ inches wide.

13. A method of manufacturing a fluid-release mold comprising the steps of:

providing a preformed, porous mold body having a first exterior surface and a second surface;

forming a groove in said second surface;

covering said groove with a cover material to form a conduit between the surface of said groove and said cover material for directing release fluid to said mold body; and covering said mold body with a fluid-impermeable backing material whereby egress of fluid from said conduit is prevented except through the mold body in a direction away from said second surface.

14. A method in accordance with claim 13 wherein the step of covering said groove includes applying adhesive tape of a width greater than the width of the groove at the second surface to said second surface on either side of said groove.

15. A method in accordance with claim 14 wherein said tape is comprised of an aluminum foil tape with an adhesive material applied to one of its surfaces.

16. A method in accordance with claim 13 wherein the step of covering said mold body includes applying a mixture of sand and fine gravel bonded together by an epoxy resin directly to said second surface and said tape.

17. A method in accordance with claim 13 wherein the step of covering said mold body includes first applying a layer of relatively liquid epoxy resin to said second surface and thereafter applying a mixture of sand and fine gravel bonded together by an epoxy resin.

18. A method in accordance with claim 17 wherein the epoxy resin applied to said second surface and the epoxy resin used to bond said sand and fine gravel are the same.

19. A method in accordance with claim 13 further comprising the step of mounting the mold body and backing material in a metal casing.

20. A method of manufacturing a fluid-release mold comprising the steps of:

providing a preformed, porous mold body made from an alumina containing ceramic material fired to a point short of the theoretical density for said material, said preformed mold body having a first exterior surface and an opposite second surface with a mold face being formed in said first surface;

forming a groove in said second surface;

covering said groove with flexible adhesive tape to form a conduit between the surface of said groove and said tape for directing pressurized release fluid to said mold, said tape having a width greater than the width of said groove at said second surface to attach said tape on either side of said groove;

arranging the conduit formed by said groove and tape such that the release fluid supplied to said conduit is conveyed through the mold body to substantially the entire mold face; and covering said second surface and said tape with backing material comprised of a mixture of sand and gravel bonded together by an epoxy resin.

21. A method in accordance with claim 20 wherein said ceramic mold body comprises at least 70% alumina, up to 15% ball clay and up to 15% talc by weight.

22. A method in accordance with claim 20 further comprising the step of mounting said mold body and said backing material in a metal casing.

23. A method in accordance with claim 22 further comprising the step of forming a gypsum plaster cap over the back of the resin bonded sand and gravel.

24. A method in accordance with claim 20 further comprising the step of applying a layer of liquid epoxy resin to said second surface and said tape prior to covering said second surface with said resin bonded sand and gravel.

25. A method in accordance with claim 24 wherein the same epoxy resin is used for application to said second surface and for bonding said sand and gravel.

* * * * *

UNITED STATES PATENT AND TRADEMARK OFFICE

CERTIFICATE OF CORRECTION

PATENT NO. : 4,413,966

DATED : November 8, 1983

INVENTOR(S) : Walter H. Mills and Joseph T. Bilbrey, Sr.

It is certified that error appears in the above—identified patent and that said Letters Patent is hereby corrected as shown below:

In Claim 8, column 7, line 49, after "fluid" insert --from--.

Signed and Sealed this

*Seventeenth* Day of *January 1984*

[SEAL]

*Attest:*

GERALD J. MOSSINGHOFF

*Attesting Officer* *Commissioner of Patents and Trademarks*